United States Patent
Starr et al.

(10) Patent No.: US 12,499,907 B2
(45) Date of Patent: Dec. 16, 2025

(54) SYSTEMS FOR AND METHODS FOR MODE HOP DETECTION IN HEAT ASSISTED MAGNETIC RECORDING

(71) Applicant: Avago Technologies International Sales Pte. Limited, Singapore (SG)

(72) Inventors: Gregory Wayne Starr, Boulder, CO (US); Donald Charles Grillo, Lakeville, MN (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 119 days.

(21) Appl. No.: 18/479,693

(22) Filed: Oct. 2, 2023

(65) Prior Publication Data

US 2024/0371406 A1    Nov. 7, 2024

Related U.S. Application Data

(60) Provisional application No. 63/500,407, filed on May 5, 2023.

(51) Int. Cl.
*G11B 7/126* (2012.01)
*G11B 5/02* (2006.01)
*G11B 5/00* (2006.01)

(52) U.S. Cl.
CPC ............... *G11B 7/126* (2013.01); *G11B 5/02* (2013.01); *G11B 2005/0021* (2013.01)

(58) Field of Classification Search
CPC .... G11B 7/126; G11B 5/02; G11B 2005/0021
See application file for complete search history.

(56) References Cited

U.S. PATENT DOCUMENTS 9,741,386 B1 * 8/2017 Rausch ............... H01S 5/0427
2020/0326391 A1 * 10/2020 Braganca ............ G11B 5/3903

* cited by examiner

*Primary Examiner* — Andrew Sasinowski
(74) *Attorney, Agent, or Firm* — Foley & Lardner LLP

(57) ABSTRACT

Mode hop detection is provided. A device includes circuitry to receive, from a reader element an indication of one or more properties of a magnetic medium detected by the reader element. The device includes circuitry to determine an envelope of the signal. The device includes circuitry to adjust, responsive to the envelope, a current provided to a laser configured to heat the magnetic medium.

19 Claims, 8 Drawing Sheets

SYSTEMS FOR AND METHODS FOR MODE HOP DETECTION IN HEAT ASSISTED MAGNETIC RECORDING

CROSS-REFERENCE TO RELATED APPLICATIONS

This disclosure claims priority to U.S. Provisional Patent Application No. 63/500,407 filed May 5, 2023, which is incorporated herein by reference in its entirety for all purposes.

FIELD OF THE DISCLOSURE

This disclosure generally relates to systems and methods for detecting mode hops in lasers. For example, the lasers can interface with heat-assisted magnetic recording (HAMR) media.

BACKGROUND

In the last few decades, storage density of magnetic devices has increased as competing technologies such as NAND flash have increased in usage. Heat-assisted magnetic recording (HAMR) media can heat a media such as a spinning hard disk drive platter, which may decrease a coercivity (e.g., susceptibility) for magnetization. For example, the storage media can be heated with a laser. A heated portion of the drive may be written to (e.g., magnetized or demagnetized) to store information. HAMR media can be employed in a variety of applications having various read-write speeds or input/output ratios.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1:
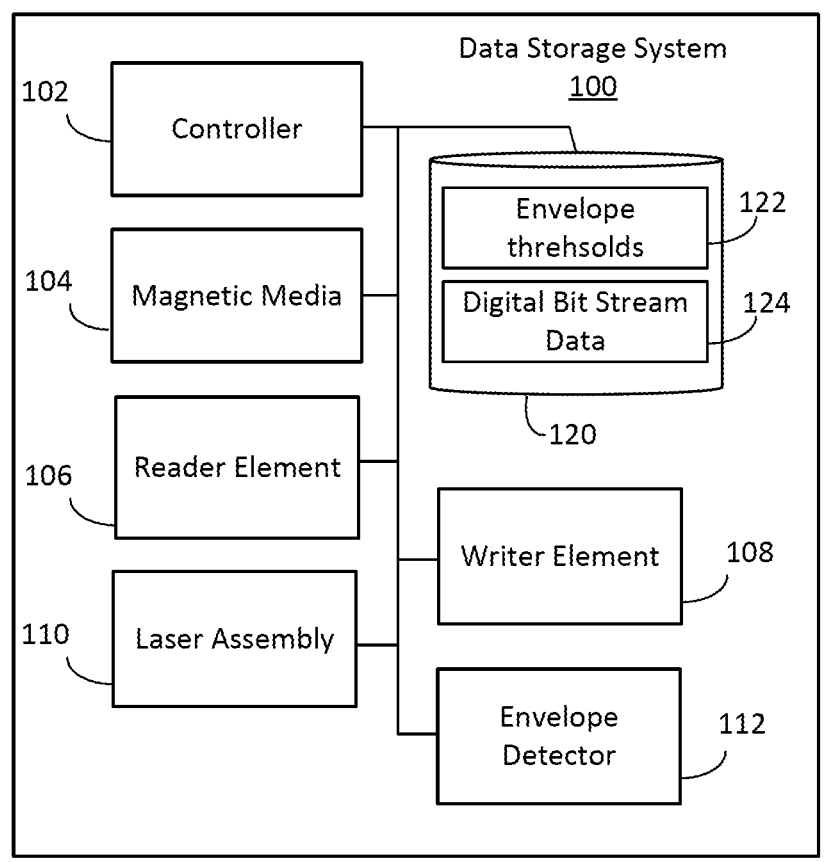
FIG. 1 is a schematic block diagram of a data storage system, according to some embodiments.

The details of various embodiments of the methods and systems are set forth in the accompanying drawings and the description below.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Some embodiments disclosed herein are related to a device. The device can include circuitry configured to receive, from a reader element, a signal. The signal includes an indication of one or more properties of a magnetic medium detected by the reader element. The device can include circuitry configured to determine an envelope of the signal. The device can include circuitry configured to adjust, responsive to the envelope, a current provided to a laser configured to heat the magnetic medium.

In some embodiments, the device is a disk drive, a movable arm, a head for the movable arm. In some embodiments, the one or more properties of the magnetic medium include a direction of magnetic polarization and a magnitude of magnetic polarization. In some embodiments, the signal comprises an indication of a value of one or more bits stored on the magnetic medium. In some embodiments, the circuitry determines the envelope using a quantity of the one or more bits, which exceeds a quantity of sequential bits of a same type stored on the magnetic medium. In some embodiments, the circuitry stores information corresponding to the value of the one or more bits during an elapsed time between a mode hop event and the adjustment of the current provided to the laser. In some embodiments, the circuitry provides information to a writer element subsequent to the adjustment of the current, the writer element configured to write the information to the magnetic medium.

In some embodiments, the circuitry is disposed along a movable arm, the movable arm comprising the reader element. In some embodiments, the device includes a movable arm comprising a writer element to write to the magnetic medium, the movable arm configured to align the writer element and the reader element along a track of the magnetic medium. In some embodiments, the adjustment to the current provided to the laser is provided by components disposed along the movable arm. In some embodiments, the adjustment to the current provided to the laser is provided by a controller remote from the movable arm. In some embodiments, the device include a movable arm including the reader element and a second reader element, different from the reader element, configured to resolve a bitwise value for a bit position along a track of the magnetic medium, the movable arm configured to align the reader element with a writer element during write operations. In some embodiments, the circuitry includes a controller configured to convey an indication of a detection of a mode hop to a processor. The processor can present the indication of the detection of the mode hop. The processor can cache additional information responsive to the indication. For example, the additional information can be information to be written (e.g., re-written) to the magnetic medium.

Some embodiments disclosed herein are related to a method. The method includes receiving, from a reader element, a signal comprising an indication of one or more properties of a magnetic medium detected by the reader element. The method includes determining an envelope of the signal. The method includes adjusting, responsive to the envelope, a current provided to heat the magnetic medium.

In some embodiments, the method includes providing, to a controller, an address for a location corresponding the one or more properties of the magnetic medium. In some embodiments, the location comprises a track and sector of the magnetic medium, and the magnetic medium is disposed over a disk drive platter. In some embodiments, the one or more properties of the magnetic medium comprise a direction of magnetic polarization corresponding to a bit value and a magnitude of magnetic polarization. In some embodiments, the adjustment to the current is provided by circuitry disposed on a same movable arm as a laser driver configured to heat the magnetic media, and the reader element. In some embodiments, the method includes storing information corresponding to a value of one or more bits during an elapsed time between a mode hop event and the adjustment of the current. In some embodiments, the method includes providing information to a writer element subsequent to the adjustment of the current, the writer element configured to write the information to the magnetic medium.

Some embodiments disclosed herein are related to a system. The system includes a magnetic medium, a laser diode, a reader element, and a controller. The controller is configured to receive, from the reader element, an indication of one or more properties of the magnetic medium detected by the reader element. The controller is configured to adjust, responsive to the indication, a current provided to the laser diode, the laser diode configured to heat the magnetic medium.

In some embodiments, the system includes a writer element. The controller can be configured to provide information to the writer element to write the information to the magnetic medium, based on the indication.

Heat-assisted magnetic recording (HAMR) media, such as HAMR drives can heat the media to different temperatures when energy from a laser is focused on the media. When the power output of the laser changes, the temperature can also change. This temperature change can result from a mode hop event, wherein the shape of the laser beam changes. When the beam shape changes, the light can couple into various optical elements differently, which can cause a change in the amount of energy that is focused on the media. Mode hopping may result in over or under heating of a surface of a recording media, and may correspond to varying magnetization of the media, which can correspond to remediation, or loss of data (e.g., too small of magnitudes may result in insufficient signal strength, too large of magnitudes may interfere with adjacent tracks, sectors, or the like). Detecting the mode hopping quickly may reduce an amount of remediation or lost data, and may thus increase device performance (e.g., throughput, latency, or reliability). A reader element can read magnetized information written to the drive to generate a corresponding signal (e.g., a voltage signal), and determine an envelope corresponding to the signal with the data. The reader element can determine that the envelope deviates from (e.g., is greater or less than) an expected envelope such as based on a comparison to a threshold. Based on the deviation, a signal can be sent to the SoC or an adjustment of the laser drive current can be made (e.g., to increase or decrease a power of the laser). The adjustment can return the laser to a power level prior to the mode hopping. A portion of the drive can thereafter be re-magnetized, such as according to information stored in a buffer or cache of the HAMR drive, based on the read information, or based on a receipt of further information provided to the HAMR drive, responsive to an indication, from the HAMR drive, that the written information should be re-magnetized.

The HAMR drive can include a laser driver, a writer element, and one or more reader elements. The laser driver can provide the drive current to a solid state laser. The write driver can drive a magnetic coil in a head to write information to the magnetic medium. The reader element is used to sense the data written to the magnetic medium. In some embodiments, a first reader element may be configured to detect digital information written to the media, and a second reader element may be configured to detect an envelope corresponding to the data. For example, the second reader element can be configured to receive an analog envelope, average value, or the like. The read receivers can have a high bandwidth (e.g., a GHz-range bandwidth) which may detect a change in laser power faster than, for example, thermal sensors which may detect changes slower, (e.g., in the kHz-range). As the data is written to the disk, the reader element is used to monitor the written data. Based on a read data signal from the reader element, an envelope detector can determine if a mode hop occurred that made a change to the data written to the disk that could result in a poor data recording.

FIG. 1 depicts is a schematic block diagram of a data storage system, according to some embodiments. The data storage system 100 can include or interface with at least one controller 102, magnetic medium 104, reader element 106, writer element 108, laser assembly 110, and envelope detector 112. The controller 102 or other components of the data storage system 100 can include a processing unit or other logic device such as a programmable logic array engine, or module configured to communicate with a data repository 120. The data repository 120 can include one or more memory locations, separate from the magnetic medium 104, which can include hardcoded, configurable, or other values. The data repository 120 can include volatile or non-volatile memory locations such as flash or random access memory (RAM). The data repository 120 can be integral to or separate from the controller 102. The data repository 120 can store one or more instances of an envelope threshold 122 or digital bitstream datum 124. For example, the data repository 120 can store a present bit of a bit stream or a cache of information related thereto (e.g., bit-wise, byte-wise, sector-wise, or other aggregations of bitstream data). Cache may refer to or include a memory location to accumulate information which may thereafter be transmitted, read, written, or discarded. Cache may also refer to the action of storing such information in such a location. The employment of cache can reduce a number of transmit operations, such as to re-transmit write data for later comparison, re-writing, or so forth.

Envelope thresholds 122 may refer to or include a threshold to identify a boundary of a signal envelope. For example, the threshold can include a one or more values to compare to one or more values of the envelope to classify the envelope as exceeding, or not exceeding the threshold (e.g., a binary classification). An envelope may refer to or include a signal portion indicative of an outline of a signal, such as a function that describes the amplitude variations of a signal over time. For example, the envelope may include analog information indicative of a magnitude of a bit value of one or more bits encoded in a signal. The envelope may be derived according to a maximum analog value or smoothing function such as a Hilbert transform or other digital signal processing applied to a signal. In some embodiments, a smoothing or other processing function can be implemented in or include hardware implemented at a head of a moving arm of a storage device.

The envelope threshold 122 can include a magnitude of a signal such that either of a '1' or '0' bit are compared to a same magnitude limit (e.g., an absolute value of a magnetic polarization). The envelope threshold 122 can include a maximum value of the envelope, or can be based on bit-wise information (e.g., the envelope detector can compare a value based on a known bit value, such that an envelope threshold 122 comprises a '1' threshold and a separate '0' threshold). In some embodiments, the envelope threshold 122 can depend on information stored in adjacent tracks or bit positions of the same track (e.g., a threshold for a '1' bit surrounded by '0's may vary from a threshold for a '1' bit surrounded by '1's). The one or more envelope thresholds 122 can be a predefined value. The envelope thresholds 122 can be established at a time of commissioning of the data storage system 100 or periodically updated responsive to calibration or detected envelopes, bit error rates, or the like. The envelope thresholds 122 can be separate for each bit or can vary across various bits. For example, in some embodiments, one or more points measured along a single bit position can be indicative of an envelope exceeding a threshold; in some embodiments, one or more points measured along a single bit position may not indicate an exceedance of a threshold, absent further data (e.g., according to a DSP technique, rectified accumulator sensitivity, or so forth).

Bitstream data 124 may refer to or include a digital representation of one or more bits read from, or configured to be written to, the magnetic medium 104. For example, a controller can receive a defined amount of information (e.g., a bit or a sector, such as a 512-byte sector, or a 4096-byte sector). The amount of information can vary between controllers in a system. For example, in an illustrative and non-limiting example of a particular computing device, an applications processor can receive many gigabytes of bitstream data 124 to be written to a magnetic medium 104, and convey a subset thereof (e.g., many megabytes) as bitstream data 124 to a cache location accessible to a drive controller. The drive controller can access a subset of the information from the cache location (e.g., many kilobytes), and provide bitstream data 124 including one sector of information to a preamplifier disposed on or proximal to a moving arm, whereupon the preamplifier can provide bit-wise bitstream data 124 to a writer element disposed on the head of the moving arm. Like other data instances, the bitstream data 124 may be referred to as information (e.g., bitstream information) without limiting effect.

The data storage system 100 can include, interface with, or otherwise utilize at least one controller 102. The controller 102 can include or interface with one or more processors and memory. The processor can be implemented as a specific purpose processor, an application specific integrated circuit (ASIC), one or more field programmable gate arrays (FPGAs), a group of processing components, or other suitable electronic processing components. The memory can include one or more devices (e.g., random access memory (RAM), read-only memory (ROM), flash memory) for storing data and computer code for completing and facilitating the various processes or operations of the present disclosure. Such memory devices may be coextensive with or separate from the data repository 120. The memory devices can be or include volatile memory or non-volatile memory and may include any type of information structure for supporting the various activities and information structures of the inventive concepts disclosed herein. The memory can be communicably connected to the processor and include computer code or instruction modules for executing one or more processes described herein. The memory can include various circuits, software engines, and/or modules that cause the processor to execute the systems and methods described herein, such as to cause the communication or processing of bitstream data between an applications processor and the magnetic medium 104.

The data storage system 100 can include at least one magnetic medium 104 designed, constructed, or operational to store data encoded according to a magnetic polarization or magnitude. A magnetic medium 104 may refer to or include material configured to store information according to a magnetic field, such as a magnetic field stored in a ferrous material disposed over a platter of a disk drive, a tape for a cassette system, or so forth. In some instances, the platter itself, or a facing thereof may be referred to as the magnetic media 104, even where such a component may include additional non-ferrous portions, such as a substrate, protective layer, lubricant layer, or so forth. Further, some magnetic media 104 can include multiple magnetic recording layers (MRL), which may be referred to as a magnetic medium 104, either individually, or in the aggregate. For example, the magnetic medium 104 can include one or more platters, or sides thereof which can be arrayed into cylinders, sectors, and tracks, or another addressable location, such as according to a logical block address. Each addressed location can correspond to one or more bits, such as to a particular bit position or to a track including a predefined number of bit positions (also referred to as bit addresses, even where such bits may not be individually addressable by one or more components of the data storage system 100).

The platter sides or other magnetic medium 104 can store information according to a magnetic polarization. That is, a portion of the surface of the platter may be magnetized to a pre-defined direction corresponding to information (e.g., to a bit value). For example, a polarization in a first direction can correspond to a '1,' and a polarization in a second direction, such as a direction which is opposite or perpendicular to the first direction can correspond to a '0.' A reader element 106 can be configured to retrieve such magnetization information; a writer element 108 can be configured to impart such magnetization to store the information.

The reader element 106 can detect a magnetization of a bit position on the magnetic media 104. A reader element 106 may refer to or include a sensor configured to interact with a magnetic media to derive a signal therefrom. For example, the reader element 106 can include an electromagnetic sensor (e.g., a giant magnetoresistance (GMR) or tunnel magnetoresistance (TMR)) whereby a passage of the reader element 106 over the magnetic medium 104 can induce a signal in the sensor, correlating to the magnetic polarization in the magnetic medium 104. The passage of the reader element 106 over the magnetic medium 104 can be implemented, for example, by rotating a spinning magnetic medium 104 under the reader element 106 to cause the signal, which can thereafter be processed (e.g., amplified) to determine information components thereof, such as digitally encoded information, envelope information, or so forth.

In some embodiments, more than one reader element 106 may be present. For example, a reader element 106 configured to detect envelope information can vary from a reader element 106 to detect digitally encoded information. In some embodiments, a single reader element 106 can sense read information for the detection of the envelope information and the digitally encoded information. For example, the same reader element 106 can generate a signal which is conveyed to a digital resolver to resolve digitally encoded information, and to an envelope detector 112 to detect an envelope associated with the magnetic medium 104. The digital resolver can perform signal processing such as a comparison of a sensed signal to various threshold values or the application of checksums or other error correction techniques to derive a bitstream from the signal of the reader element 106.

In some embodiments, the reader element 106 can interface with one or more track widths. The information encoded on the magnetic medium 104 may be stored in predefined tracks which may be proximal to, abut, or overlap an adjoining track. The reader element 106 can generate a signal based on the track width, or an adjoining track. Thus, the reader can detect a magnetization exceeding a lateral dimension of a track width, or a magnetization which is less than a full track width. Such an indication can be based on an overall signal magnitude such that any of a magnitude of a magnetization, or a direction of a magnetization may module the signal generated by the reader element 106. In some embodiments, multiple reader elements 106, or various signal processing techniques can disaggregate a directionality of a signal from an amplitude of a signal. For example, a first reader element 106 can detect a signal associated with a first track, and a second reader element 106 can detect a signal associated with an adjoining track. Such an implementation may discriminate between signal variations within a bit position or track, on variations based on a contribution of other bit positions or tracks (e.g., a bit position bounded by logical '1' values in adjacent bit positions in a same or different tracks may vary from the bit position when bounded by logical '0' values).

The writer element 108 can include a coil which is energized to cause a magnetization of a portion of the magnetic medium 104. In various embodiments, the writer element 108 can encode data according to various techniques, such as individually addressed bits, non-return to zero, or modified frequency modulation encoding. The writer element 108 can pass current through a coil while disposed over a bit position to generate a magnetic field which can align a corresponding portion of the magnetic medium 104, such that a subsequent read operation, by the reader element 106 can detect the alignment.

The writer element 108, along with other depicted components, such as the reader element, and some portions of a laser assembly 110 can be disposed on a head of a movable arm. A writer element 108 may refer to or include a transmitter configured to interact with a magnetic media to store a signal thereupon, such as a coil. A movable arm may refer to or include an actuator assembly configured to position a head (e.g., a read-write head) over a surface of media of a disk drive. The arm can include several extensions to position respective heads over respective media. Such extensions may be referred to, individually or collectively, as a movable arm. A disk drive may refer to or include a storage device including rotating storage media. For example, the storage media can be or include a magnetic medium 104. A head may refer to or include a assembly suspended over a magnetic media 104, and including elements to interact with (e.g., read or write) the magnetic media 104. The head may be disposed on a movable arm, such as at a terminal portion thereof, as in the case of a disk drive. The writer element 108 can be configured lagging the laser assembly 110 portions (e.g., disposed somewhat behind, compared to a relative motion between the movable arm and the magnetic medium 104). Such a lagging configuration can cause the laser assembly 110 to pass over and heat the magnetic medium 104 prior to the writer element 108, such that the heated portion of the magnetic medium 104 exhibits decreased coercivity, and is thus magnetized selectively to other portions of the magnetic medium 104.

The reader element 106 can be disposed lagging the writer element 108 such that the reader element 106 can detect a magnetization imparted, by the writer element 108, to the magnetic medium 104. Thus, each of the reader element 106, the writer element 108, and (a portion of) the laser assembly 110 can be aligned over the magnetic medium 104, such as to pass over a track disposed on a platter in sequence. In some embodiments, the various elements may be otherwise disposed. For example, a reader element 106 can lead the writer element 108 and laser assembly 110. Such a reader element 106 can be a same reader element 106 as is employed to capture the signal from which the envelope is derived, or can be a separate reader element 106. Likewise, the reader element 106 can be somewhat offset from (e.g., configured to pass over another track).

A laser assembly 110 can heat a portion of the magnetic medium 104. For example, the laser assembly can include an adjustable current source which is configured to provide a constant current to a laser diode. The laser diode can provide a laser beam to a near field transducer (NFT). In some embodiments, the laser diode can pass through one or more optical elements intermediating the laser diode from the NFT. For example, a mirror, waveguide, or the like can define a path of the laser beam. The NFT can be configured to heat a portion of the magnetic medium 104 based on energy derived from the laser assembly 110. For example, the NFT can employ plasmonic interactions to concentrate an electromagnetic field along a track (e.g., bit position) of the magnetic medium 104.

The laser assembly 110 can modulate an output power incident to changes in temperature, mechanical vibrations, reflection variations, or so forth. For example, the laser diode can mode hop between various longitudinal modes (e.g., discrete frequencies or wavelengths). Such mode hoping may, in turn affect a magnitude or areal specificity of heating applied to the magnetic medium 104, which can, in turn, affect the magnetic properties of the magnetic medium 104 (e.g., the magnetic medium 104 can be heated to or above a curie point of the material). Subsequent reads of the magnetic medium 104 may thus include errors. For example, a number of errors may exceed a forward error correction (FEC) or detection limit, which may impact device operation.

An envelope detector 112 can determine an envelope for a signal read from the magnetic medium 104. For example, the envelope detector can be or include a low pass filter applied to a signal. The signal may be rectified such that the envelope detector can compare a value of a signal (e.g., average value, maximum value, or other value) to a predefined threshold which is not dependent on a bit-value. A value of a bit may refer to a binary indication of a bit (e.g., a 1 or a 0). Some bit values may be indeterminate, such as a bit which has a polarity less than a detection threshold (e.g., an X bit). In some embodiments, the envelope detector 112 can detect the envelope over a pre-determined amount of time, which may correspond to, or be based on, a sequential number of zero or non-zero bits. The envelope can be or include a peak value for the period of time, such as a single peak-to-peak value or a value of one or more peaks of a function. In some embodiments, the envelope detector 112 can determine the envelope by comparing the signal to a threshold to determine whether the envelope exceeds or does not exceed the threshold (e.g., the determination may be Boolean with regard to one or more envelope thresholds 122). The data storage system 100 can adjust the current of the laser driver 212 based on the detected envelope. For example, a current magnitude may be adjusted upwards or downwards. The envelope detector 112 can convey an indication of the adjustment to a controller, such that the controller may re-write the sector, notify another controller, or take another action.

According to various embodiments, the envelope detector 112 may be implemented in various ways. For example, the envelope detector 112 can be or include a digital processing circuit of a controller, or discrete circuitry disposed on a moving arm. In some embodiments, the envelope detector 112 can compare a signal to a rolling average magnitude, or to a predefined fixed value. The envelope detector 112 can be configured to compare the detected envelope to one or more thresholds such as an upper threshold or a lower threshold. The envelope detector 112 can compare a read data signal value based on a bit value of a read or adjacent position, or may be agnostic as to digital components of stored on the magnetic medium 104. That is, the envelope detector 112 may determine an envelope of a rectified signal such that a directionality of a polarity is not determinative of a threshold.

Figure 2:
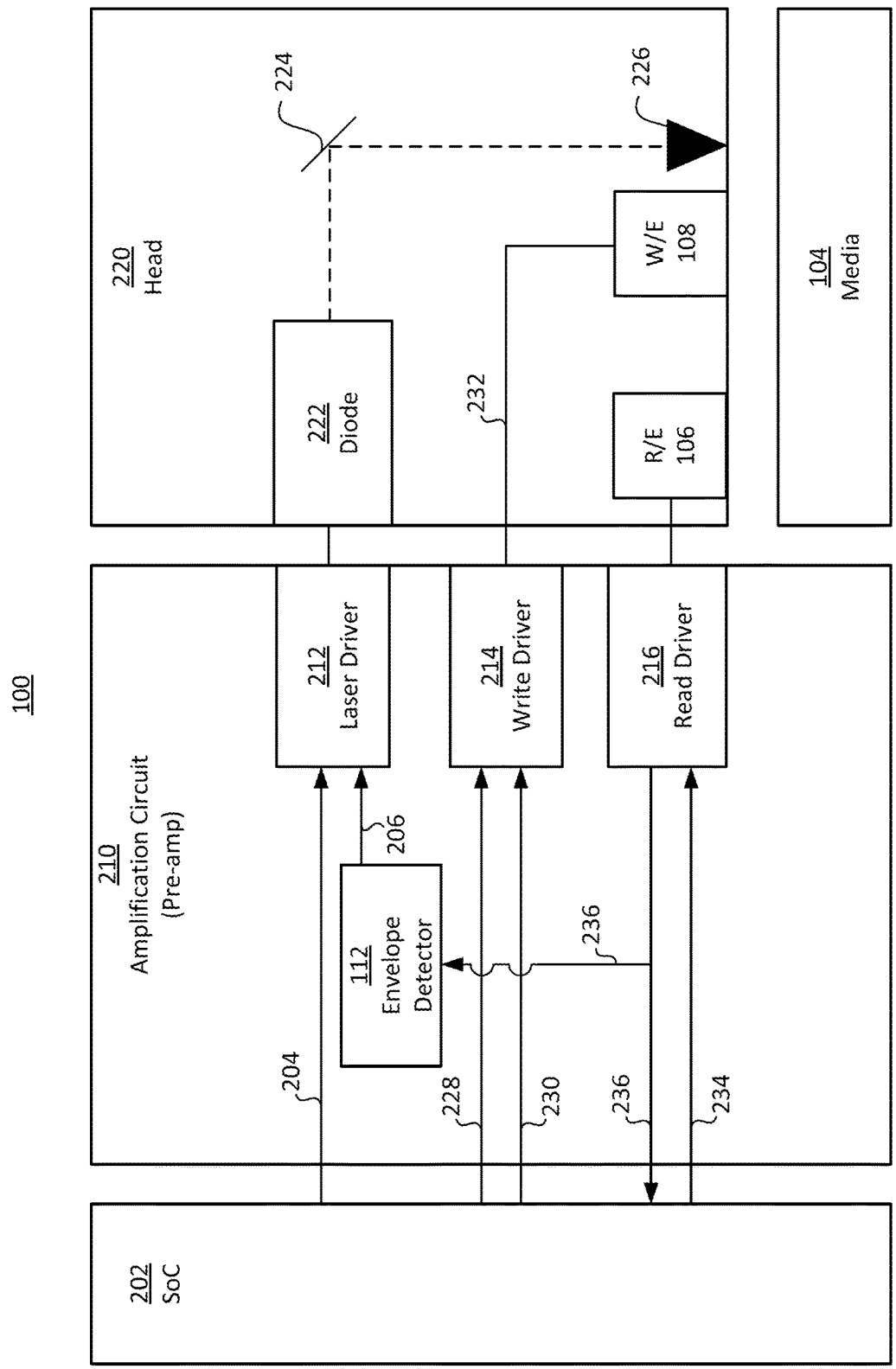
FIG. 2 is another schematic block diagram of a data storage system, according to some embodiments.

Referring now to FIG. 2, another schematic block diagram of a data storage system 100 is provided according to some embodiments. The data storage system 100 includes a system on a chip (SoC) 202, amplification circuit 210 (which may also be referred to as a "preamplifier"), and head 220 (e.g., read-write head). The data storage system 100 can include or interface with recording media, such as a magnetic medium 104 of one or more platters of a hard drive, or a layer, sector, track or other portion thereof. A platter may refer to or include a substrate which can include storage media upon facings thereof. For example, the platter may include an aluminum or glass substrate and various coatings such as a magnetic coating configured to store information.

The SoC 202 can provide or control current provided to a laser driver 212 to propagation to the laser. For example, the SoC can provide a base laser current 204. The total laser current may be a constant current, or may include offsets or adjustment following calibration of a device, temperature changes, and so forth. For example, the SoC 202 (as depicted hereinafter, at FIG. 3), or another portion of the system (e.g., the envelope detector 112) may provide current adjustments 206 responsive to a detection of mode hopping, or other variations in laser power output, frequency, the state of the magnetic media 104, etc. The combination of the base current 204 and the current adjustment 206 can be configured to maintain an amount of thermal energy applied to a bit position of the magnetic medium 104. For example, the total current can be provided to a laser driver 212 for a laser diode 222. The laser diode can generate a laser beam, which may pass through various optical elements 224 to an NFT 226 to heat a bit position disposed along the magnetic medium 104.

The SoC 202 can exchange information (e.g., signals) with a writing device (e.g., a write driver 214). For example, the SoC 202 can provide write current 228 and write data signal 230 to a write driver 214, which, in turn, generates a write signal 232 for a writer element 108 (e.g., a coil thereof) to cause a magnetic field to magnetize the bit position heated by the NFT 226. For example, the write data signal 230 can include bit timing, polarization orientation, and so forth. The write driver 214 can generate the write signal 232, based on the write current 228 and the write data signal 230 to energize the write element to cause a magnetization of the magnetic medium 104 subsequent to the heating of the bit position. At a write time, the bit position may be elevated above an ambient temperature or above a curie temperature.

The SoC 202 can exchange information (e.g., signals) with a reading device (e.g., a read driver 216). For example, the SoC 202 can provide a reader current 234 to the read driver 216, and receive read data signal 236. The read data signal 236 can include an indication of one or more properties of a magnetic medium 104 detected by the reader element 106. Properties of a magnetic medium may refer to or include a value corresponding to a bit position, track, or other information stored upon the magnetic medium. For example, the read data signal 236 can provide an indication of a digital component of a bitstream encoded upon the magnetic medium 104, and an analog component (e.g., a signal envelope). The read data signal 236 can be a voltage, current, or other signal having levels corresponding to a digital value, and an analog value which may correspond to a track width, edge effects, a susceptibility of the magnetic medium 104 to magnetization during a write operation, magnetic relaxation since the data was written, etc. The envelope can be or include an indication of a detection of a mode bop. For example, the read driver 216 can provide the read data signal 236 to the SoC 202, which can derive a digital bitstream therefrom, and to an envelope detector 112, to detect an envelope therefrom. In various embodiments, the data storage system 100 can include filter elements between the read data signal 236 provided to the SoC 202, for determination of the bitstream, and the envelope detector 112 for detection of the envelope. In some embodiments, the respective read data signals 236 can be separate signals originating at separate reader elements 106.

The SoC 202 may initiate, schedule, cause, monitor, or otherwise control the operation of the laser driver 212, write driver 214, read driver 216, envelope detector 112, movable arm, magnetic medium 104, laser assembly 110, and other components of the system. The SoC 202 may include or interface with one or more processors, and may communicate with an application, operating system, or other processor of a device. One SoC may interface with any number of other devices. For example, a hard drive disk can include any number of recording mediums, (e.g., platters), corresponding to various moving arms, drivers, read/write elements, and so forth.

The relative positions of the NFT 226 and writer element 108 may correspond to a relative leftward displacement of the magnetic medium 104. That is, the magnetic medium 104 can pass leftward under the depicted head 220 or the head can proceed rightward over the magnetic medium 104, such that the NFT 226 passes over a bit location, followed by the writer element 108, proximal thereto. Thereafter, the reader element 106 can pass over the written bit position to determine a signal corresponding to the bit position. Further, each of the reader element 106, writer element 108, and NFT 226 are configured to interface, electromagnetically, with a surface of the magnetic medium 104.

In general, however, the depicted block diagram is not intended to convey scale or physical location. For example, the laser driver 212, write driver 214, or read driver 216 can be separate from, proximal, or integral to the SoC 202. In some embodiments, such components can be disposed on a same semiconductor die or package. In some embodiments, the depicted amplification circuit 210 can be disposed along a moving arm of a storage device, and the SoC 202 can be disposed on a circuit board which is not disposed along the moving arm.

Figure 3:
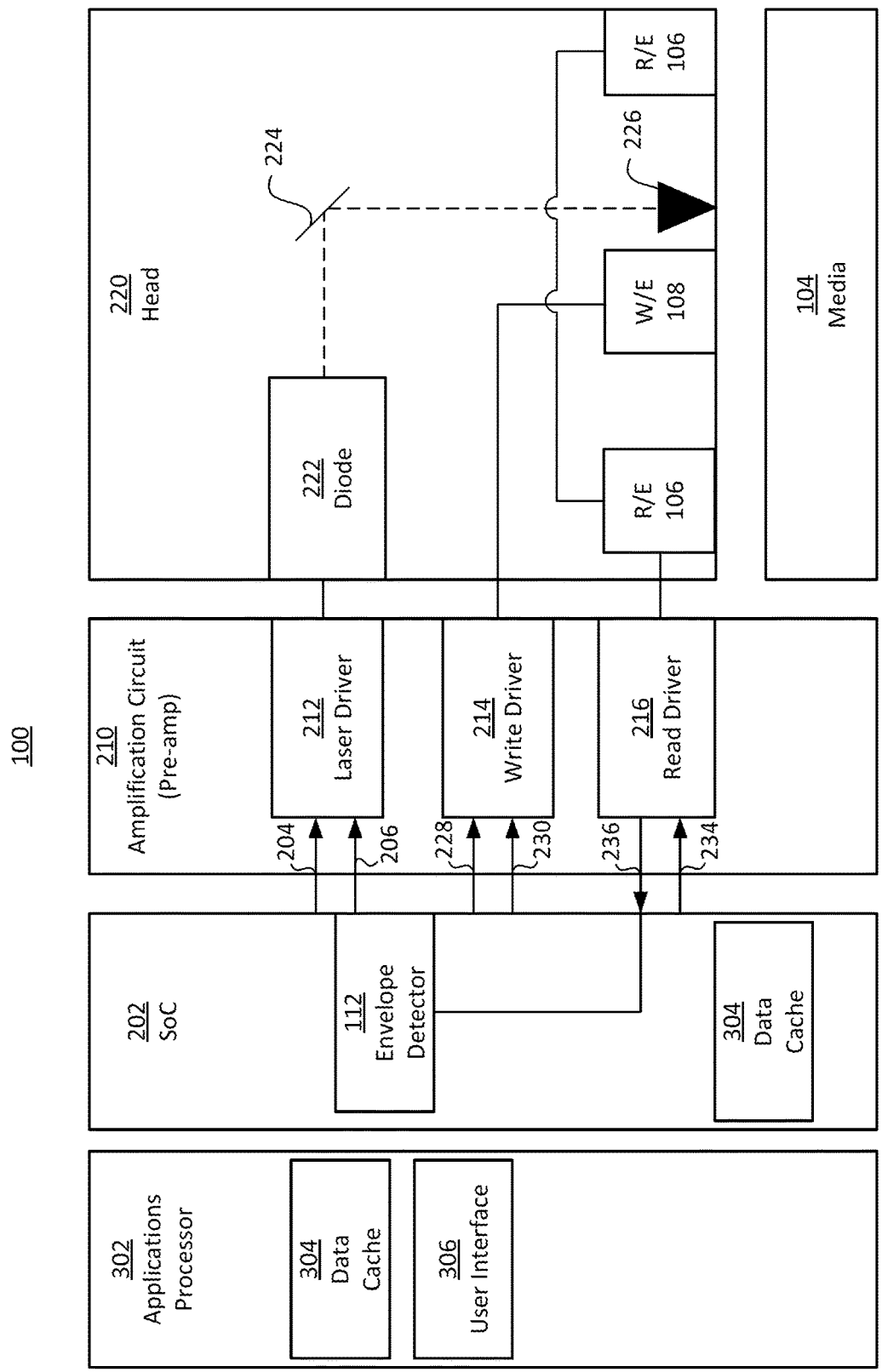
FIG. 3 is yet another schematic block diagram of a data storage system, according to some embodiments.

Referring now to FIG. 3, another schematic block diagram of a data storage system 100 is provided according to some embodiments. The data storage system 100 includes an envelope detector 112 integral to the SoC 202. For example, the envelope detector 112 may be located on a same die, package, or the like. The SoC 202, including the envelope detector 112, may be disposed along or apart from the movable arm. Further depicted is a second reader element 106 connected to the read driver as is described herein.

As depicted, the read data signal 236 may be connected to the SoC 202, wherein the SoC 202 can determine an envelope for the read data signal 236, along with a value of the digital bitstream. The SoC 202 can include a memory device (e.g., the depicted data cache 304 device) which can store a bitstream read from the magnetic medium 104 or a bitstream to be written to the magnetic medium 104, by the writer element 108, by operation of the write driver 214. In some embodiments, the SoC 202 can compare a digital value of a bitstream written to the magnetic medium to a digital value of a bitstream read from the magnetic medium 104, such as to detect bit flips, alignment errors, and so forth. In some embodiments, the SoC 202 can be configured to re-write data based on a comparison of an envelope, determined by the envelope detector 112, to an envelope threshold 122. For example, the SoC 202 can detect an indication of a property of a magnetic medium (e.g., a polarity or magnitude), such as an envelope indicative of a mode hop event. Based on the detection, the SoC 202 can provide a current adjustment 206 to the laser driver 212, and, subsequently, provide a signal to the write driver 214 to cause a portion (e.g., sector) of bitstream data to be re-written with the adjusted current. The SoC 202 or another component of the data storage system 100 can store the data to be re-written during an elapsed time between a mode hop event and the adjustment of the current. The elapsed time may refer to or include a time elapsed between a writing of a first bit subsequent to the mode hop, which corresponds to an indication of the mode hop (e.g., reduced polarization magnitude), and writing of a first bit subsequent to the mode hop, which does not correspond to an indication of the mode hop. The mode hop, or mode hop event, may refer to or include a change to an output power, frequency, beam-formedness, or other property of laser which causes a change in the properties of bits recorded to recordable media.

The read data signal 236 and write data signals 230 can include data which is intended for storage, along with various encoding bits which may or may not be stored on the magnetic medium 104. For example, various checksums, parity bits, header information, clock transitions, or the like may be included in a signal. Some such information may include constituent portions of a run length limited (RLL) or other encoding scheme, such that a maximum number of sequential bits may be defined. For example, a maximum number of sequential '1's' or '0's' may be defined. In some encoding schemes a ratio of '1's' or '0's' may be defined, and so forth. According to some embodiments, an envelope may depend on a sequence of bits of a length which is greater than a maximum number of sequential bits encoded in the magnetic medium 104, such as systems which are not polarity agnostic. The sequential bits may refer to or include a sequence of bits along a logical or physical organization of a drive (e.g., a track or sector) which are of a same typed-ness. The typed-ness may refer to or include a bit value, such as a one or a zero.

In some embodiments, other controllers can perform related functions. For example, an applications processor 302 can maintain a data cache 304. The SoC 202 and the applications processor 302 can be connected so as to provide an indication of mode hop or other event associated with the envelope. The applications processor 302 can provide data to be re-written, along with providing an indication of delays or caching of further data to be written to the magnetic medium 104, or can provide, to a user interface 306 in communication therewith, an indication, such as an indication of a count of events or a property of the magnetic medium 104, such as according to an analytic display (e.g., self-monitoring, analysis, and reporting technology (SMART)). Such functions are not limited to the depicted embodiments. For example, different or other processors can perform related functions. Accordingly, the references to the SoC 202, Applications processor 302, controller, processor, processing circuitry, and the like are not intended to limit an operation to a location, but are merely provided to distinguish the depicted controllers in illustrative examples. According to various embodiments, the functionality described herein as performed by one controller or processor, can be performed by any number of other controller or processors.

Figure 4:
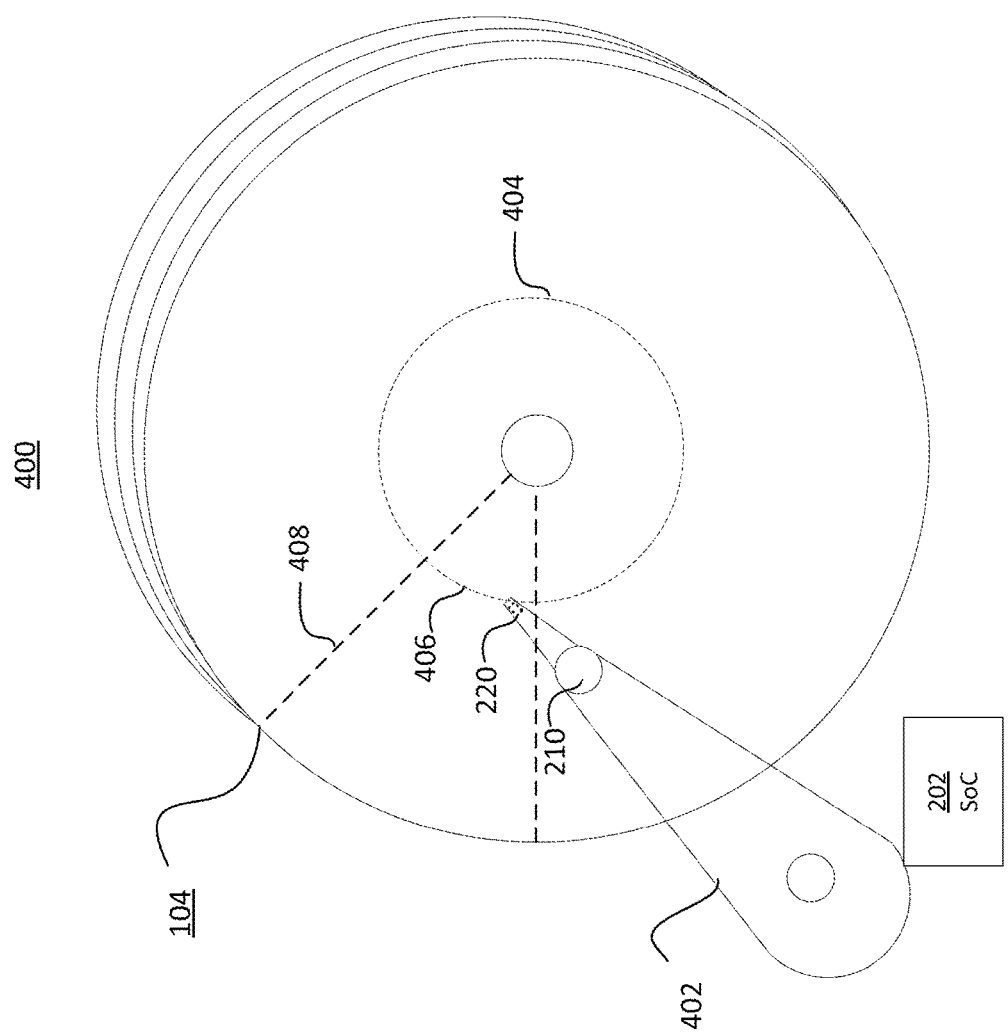
FIG. 4 is a selection of components of a disk drive, according to some embodiments.

Referring now to FIG. 4, a selection of components of a disk drive 400 is provided according to some embodiments. The components of the disk drive 400 include various drive platters comprising a magnetic medium 104 upon a facing of each. That is, each platter can include a first and second magnetic medium 104 disposed on opposite faces. The magnetic media 104 of the platters can be subdivided into concentric tracks 404 which can, in turn, be subdivided into sectors 406 along one or more radial axes 408. The track 404 may refer to or include any organization of bits which may be sequentially read. As indicated above, such tracks 404 may be formed in concentric portions about a spinning magnetic medium 104.

A movable arm 402 can be configured to interface with the various magnetic media 104, such as via various heads 220. The heads 220 can include a reader element 106 and a writer element 108 configured read from and write to a magnetic medium 104. An NFT 226, along with various other components of a laser assembly 110, such as a laser diode 222 or optical element 224 can be co-located on the head 220 or another portion of the movable arm 402. Such colocation can reduce signal variability, signal loss, propagation delays associated with signal transmission, and so forth.

The pre-amplification circuit 210 can be disposed proximal to the head 220, such as along the movable arm 402, or on a circuit board proximal to a rotational base of the movable arm 402. For example, the amplification circuit 210 can be disposed so as to maintain a predefined distance between the amplification circuit 210 and the head, the distance associated with a latency of communication, or to electrically isolate the head from the amplification circuit 210. For example, a detection of an envelope incident to a mode hop or other indication associated with re-written of lost data can be detected within a time which is less than a response threshold (which may relate to, for example, a completion of a sector 406, a control signal such as an acknowledgement of writing, or so forth).

The SoC 202 is depicted apart from the movable arm 402, such as on an adjoining circuit board (not depicted). The position of the SoC 202 can be proximal to, for example, a stepper motor or other control circuitry (not depicted) of the disk drive 400. Further, the SoC 202 may be connected to one or more transitive or non-transitive memories, or to communications channels connecting to further elements of a data storage system 100.

Figure 5:
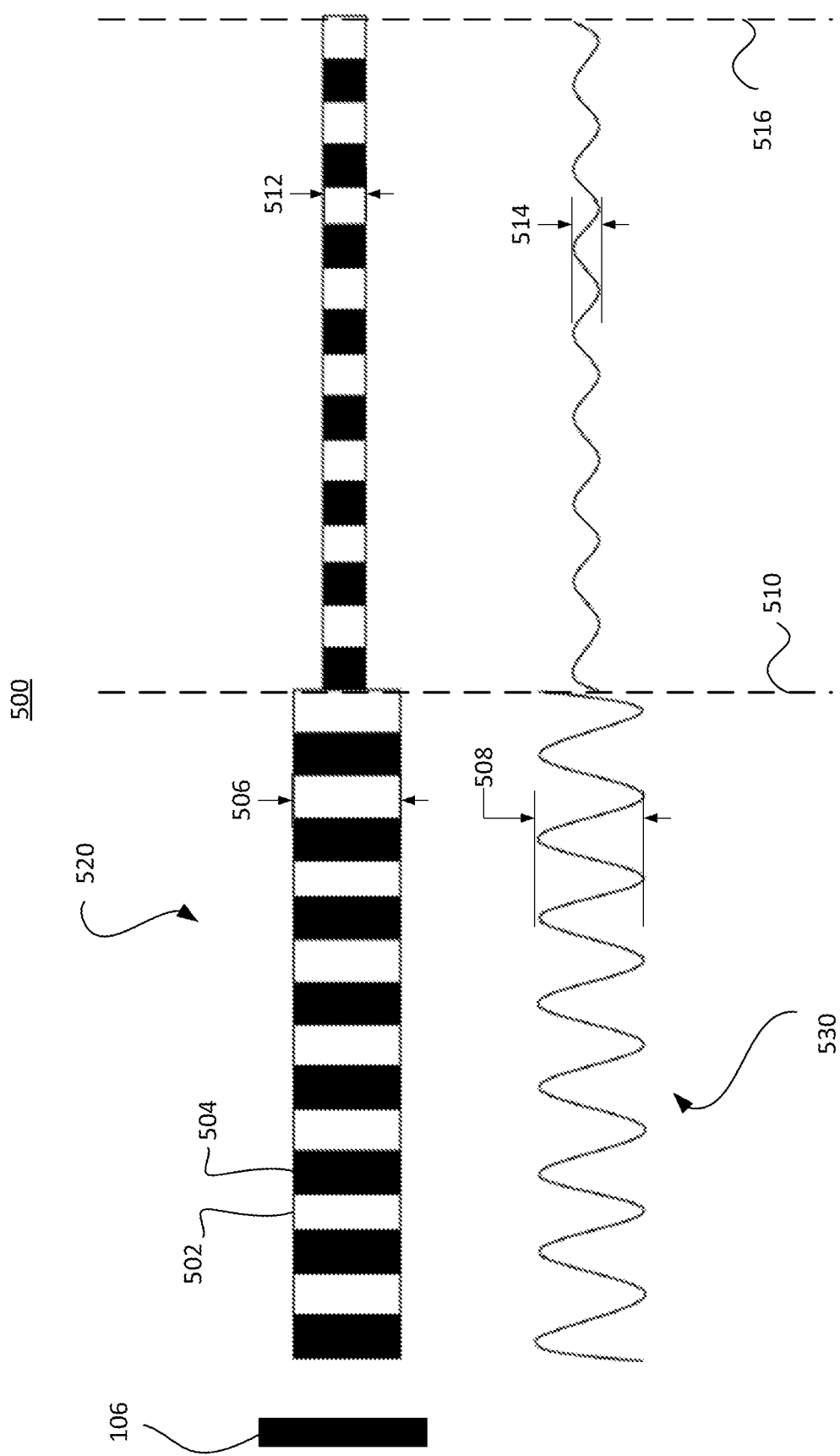
FIG. 5 is a magnetization to signal diagram, according to some embodiments.

Referring now to FIG. 5, a magnetization to signal diagram 500 is provided, according to some embodiments. A track 520 of the magnetic medium 104 includes various stored values. The stored values may be read by the depicted reader element 106. For example, the track 520 can include alternating values referred to as ones 504 and zeros 502 as depicted for case of demonstration. The reader element 106 can generate the signal 530 passing along the track 520. The signal 530 may be received by the read driver 216 to generate the read data signal 236. An amplitude 508 of the signal can correspond to a level of magnetization of the track, such as according to a first portion track width 506. A first portion of the track 520 is demarcated from a second portion of the track 520 by a discontinuity 510. The discontinuity can correspond to, for example, mode hop of the laser assembly 110 causing a reduction in power delivered to the magnetic medium 104. As depicted, the second portion track width 512 is smaller such that the reader element 106 detects a second portion of the signal 530 having a lesser amplitude 514 passing there-over.

The envelope detector 112 can detect an envelope of the signal 530 derived from the second portion, and adjust the signal strength of the total current provided to the laser driver by proving a current adjustment 206. The signal strength may be performed immediately upon detection, or after a delay, such as period aligned to a word, byte, sector 406, or the like. For example, a second discontinuity 516 can intermediate the lower amplitude signal 530 with a signal 530 having a similar amplitude. In some embodiments, the adjustment may be intended to return to the amplitude of the first portion. In some embodiments, the adjustment can be one or more fixed steps, such as following a detection of the envelope, until the desired signal is reached. (e.g., a signal level value or range be the threshold, and a deviation therefrom can cause an adjustment towards the value or range).

Figure 6:
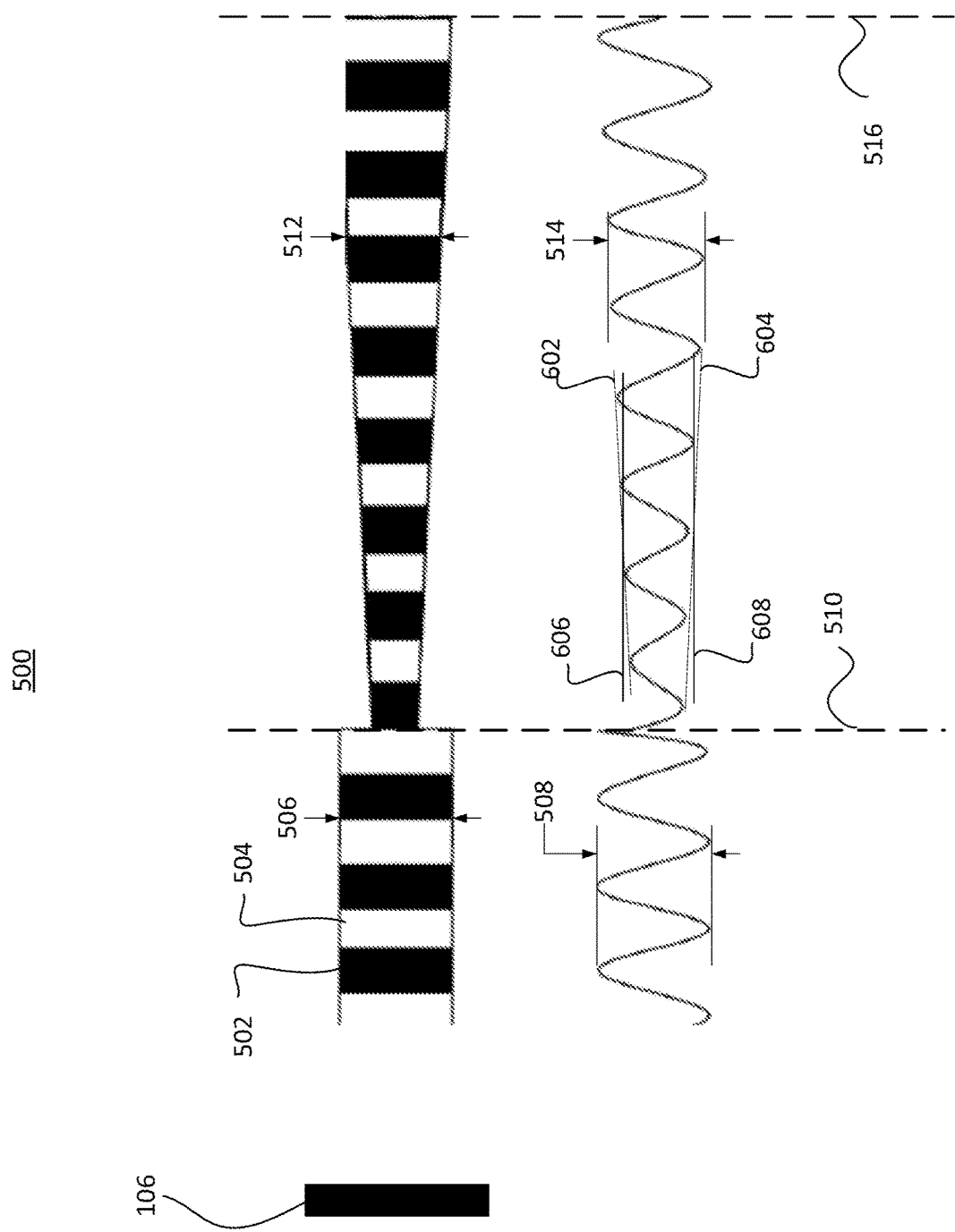
FIG. 6 is another magnetization to signal diagram, according to some embodiments.

FIG. 6 depicts another magnetization to signal diagram 500 wherein the second portion of the track width 512 slews to resume the first portion of the track width. The slew rate may correspond to a maximum adjustment rate for the laser power, or a stepped or slewed increase to avoid an overdamped signal which may, for example, interfere with adjacent tracks or other functions of the drive. For example, the SoC 202 can incrementally provide current adjustments 206 to the laser assembly 110 to cause a read value corresponding to a read data value until an envelope of a read signal conforms to (e.g., exceeds or does not exceed) one or more envelope thresholds.

Further depicted in FIG. 6 is an upper envelope line 602, corresponding to a magnitude of polarization associated with the ones 504, and a lower envelope line 604, correlating to a magnitude of polarization of the zeros 502. The envelope lines 602, 604 are defined according to a linear interpolation between the local maximums of the signal 530, for brevity and ease of depiction. Further depicted are lines corresponding to an upper 606 envelope threshold 122 and lower 608 envelope threshold 122, shown as fixed values (e.g., a horizontal lines 606, 608). At respective intersection points of the envelope lines 602, 604 and envelope threshold lines 606, 608, the signal 530 can correspond to a portion which will be re-written, or which may not be re-written (although, as indicated above, some further portions may be re-written, such as to complete sector re-writes, or maintain sequential drive operation). In some embodiments, a discontinuity which is not corrected upon rewriting may be recorded, by the SoC 202, as 'bad' an so as to inhibit future write operations to the sector 406. Write operations may refer to or include various operations conducted by components of a data storage system 100 to store information upon a storage medium. For example, the write operation can include actuation of a movable arm to an addressable location, heating of the medium, and energization of a write coil. The address, or addressable location can refer to a symbol correlating a physical location of a storage medium to a logical identity of information stored thereupon.

Figure 7:
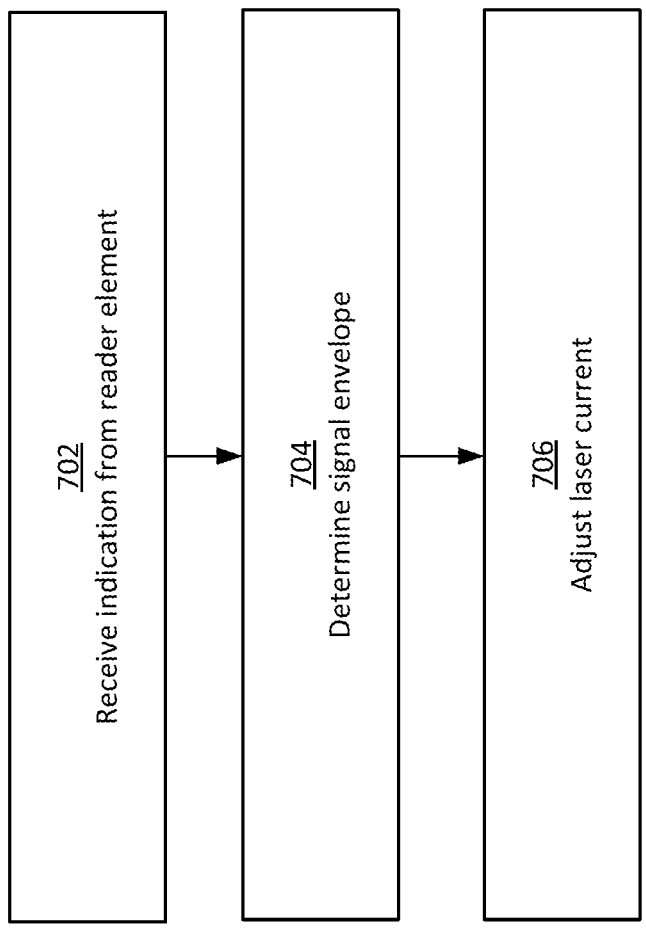
FIG. 7 is a flow diagram showing operations for detecting a mode hop of a laser, according to some embodiments.

FIG. 7 depicts a method for detection of mode hop or other anomalous write patterns. At operation 702, a signal including an indication of one or more properties of a magnetic medium 104 is received. The signal can include digital information corresponding to a bit stream associated with the magnetic medium 104. The information may include signal magnitude information corresponding to a magnetization level of the magnetic medium 104. In some embodiments, the reader element 106 may read a trailing bit or number of bits behind one or more writer elements 108. For example, the reader element 106 may automatically monitor written data, such as based on shift register of previously instructed values, an addressed location, or so forth.

At operation 704, an envelope of the signal is determined. The envelope may be determined by the SoC 202 or amplification circuit 210 (including subcomponents distributed therebetween), either of which may be disposed along a same movable arm 402 as the reader element 106 and, in some embodiments, the write element 108. The envelope may be or include an average value, analog accumulation, or other indication of the signal from the reader element 106.

At operation 706, a current provided to heat the magnetic medium is adjusted, responsive to the envelope. For example, a drive current may be adjusted to heat the drive via a laser optically coupled to an NFT 226. Such adjustment may be responsive to a comparison to a threshold, trend, bit error rate, or other indication. The indication can include an indication to the SoC 202 which may take various actions (e.g., re-write the data based on a cache, circular buffer, or shift register; request the data from an application, or the like). In various embodiments, the SoC 202 can compare a number of affected bits to a threshold, such as a threshold of ECC or FEC and take an action based on the threshold. For example, if after completion of a sector 406, an error count is indicative of a number of errors near or greater than an error correction capacity, the SoC 202 may take a different action than for a lower number of errors. In some embodiments, an action or a sequence of actions may be based on a drive activity level (e.g., the disk drive can opportunistically re-write data during periods of inactivity, such as by comparison to an activity threshold).

Figure 8:
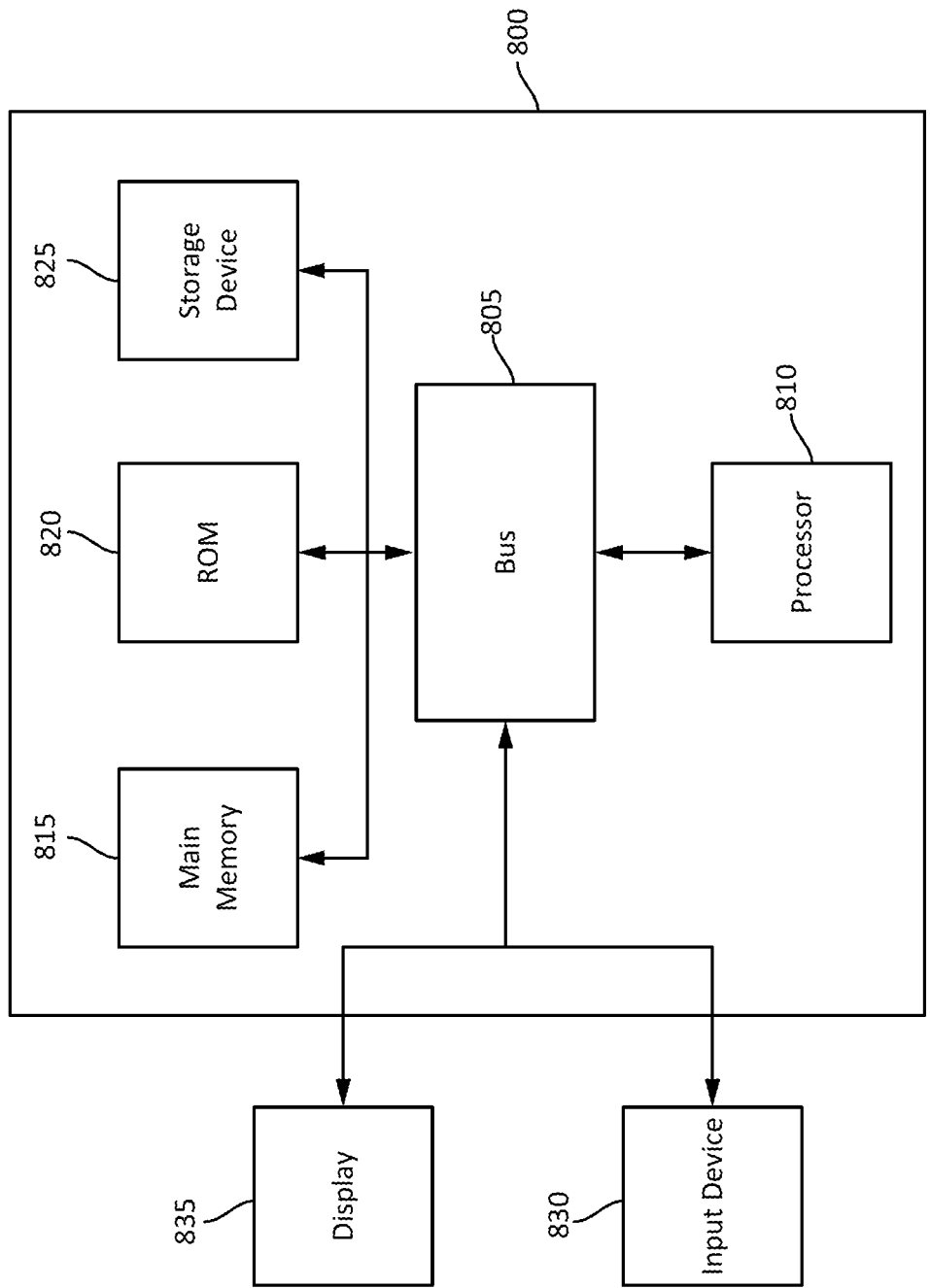
FIG. 8 is a block diagram illustrating an architecture for a computing system that can be employed to implement elements of the systems and methods described and illustrated herein.

FIG. 8 is a block diagram illustrating an architecture for a computer system that can be employed to implement elements of the systems and methods described and illustrated herein, such as the SoC 202, or other controller. The computing system 800 includes at least one bus 805 or other communication component for communicating information and at least one processor 810 or processing circuit coupled to the bus 805 for processing information. The computing system 800 can also include one or more processors 810 or processing circuits coupled to the bus for processing information. The computing system 800 also includes at least one main memory 815, such as a random access memory (RAM) or other dynamic storage device, coupled to the bus 805 for storing information, and instructions to be executed by the processor 810. The main memory 815 can be used for storing information during execution of instructions by the processor 810. The computing system 800 can include at least one read only memory (ROM) 820 or other static storage device coupled to the bus 805 for storing static information and instructions for the processor 810. A storage device 825, separate from the magnetic medium 104 such as a solid state device, can be coupled to the bus 805 to persistently store information and instructions. The computing system 800 can be coupled via the bus 805 to a display 835, such as a liquid crystal display, or active matrix display, for displaying information to a user such as analytic data of the disk drive 400.

The processes, systems and methods described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement may also be employed to execute the instructions contained in main memory 815. Hard-wired circuitry can be used in place of or in combination with software instructions together with the systems and methods described herein. Systems and methods described herein are not limited to any specific combination of hardware circuitry and software.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., reader elements, writer elements, or magnetic media) that can operate within a system or environment. It should be understood that the systems described above can provide multiple ones of any or each of those components and these components can be provided on either a stand-alone machine or, in some embodiments, on multiple machines in a distributed system. Further still, bit field positions can be changed and multibit words can be used. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C#, or in any byte code language such as JAVA. The software programs or executable instructions can be stored on or in one or more articles of manufacture as object code.

The term "coupled" and variations thereof includes the joining of two members directly or indirectly to one another. The term "electrically coupled" and variations thereof includes the joining of two members directly or indirectly to one another through conductive materials (e.g., metal or copper traces). Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical (e.g., magnetic), or optical.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A device comprising circuitry configured to:
   receive, from a reader element, a signal, the signal comprising an indication of one or more properties of a magnetic medium detected by the reader element, wherein the signal comprises an indication of a value of one or more bits stored on the magnetic medium;
   determine an envelope of the signal; and
   adjust, responsive to the envelope, a current provided to a laser configured to heat the magnetic medium.

2. The device of claim 1, wherein the device is one of:
   a disk drive;
   a movable arm; or
   a head for the movable arm.

3. The device of claim 1, wherein the one or more properties of the magnetic medium comprise a direction of magnetic polarization and a magnitude of the magnetic polarization.

4. The device of claim 1, wherein the circuitry is configured to:
   determine the envelope using a quantity of the one or more bits, which exceeds a quantity of sequential bits of a same type stored on the magnetic medium.

5. The device of claim 1, wherein the circuitry is configured to:
   store information corresponding to the value of the one or more bits during an elapsed time between a mode hop event and the adjustment of the current provided to the laser; and
   provide information to a writer element subsequent to the adjustment of the current, the writer element configured to write the information to the magnetic medium.

6. The device of claim 1, wherein:
   the circuitry is disposed along a movable arm, the movable arm comprising the reader element.

7. The device of claim 1, further comprising:
a movable arm comprising a writer element to write to the magnetic medium, the movable arm configured to align the writer element and the reader element along a track of the magnetic medium.

8. The device of claim 7, wherein:
the adjustment to the current provided to the laser is provided by components disposed along the movable arm.

9. The device of claim 7, wherein:
the adjustment to the current provided to the laser is provided by a controller remote from the movable arm.

10. The device of claim 1, further comprising a movable arm comprising:
the reader element; and
a second reader element, different from the reader element, configured to resolve a bitwise value for a bit position along a track of the magnetic medium, the movable arm configured to align the reader element with a writer element during write operations.

11. The device of claim 1, further comprising:
a controller configured to convey an indication of a detection of a mode hop to a processor, the processor configured to:
present the indication of the detection of the mode hop; or
cache information to be written to the magnetic medium responsive to the indication.

12. A method comprising:
receiving, from a reader element, a signal comprising an indication of one or more properties of a magnetic medium detected by the reader element, the one or more properties comprising a direction of magnetic polarization corresponding to a bit value and a magnitude of the magnetic polarization;
determining an envelope of the signal; and
adjusting, responsive to the envelope, a current provided to heat the magnetic medium.

13. The method of claim 12, comprising:
providing, to a controller, an address for a location corresponding the one or more properties of the magnetic medium.

14. The method of claim 13, wherein:
the location comprises a track and sector of the magnetic medium; and
the magnetic medium is disposed over a disk drive platter.

15. The method of claim 12, further comprising:
determining the envelope using a quantity of one or more bits stored on the magnetic medium, the quantity exceeding a quantity of sequential bits of a same type stored on the magnetic medium.

16. The method of claim 12 wherein:
the adjustment to the current is provided by circuitry disposed on a same movable arm as a laser driver configured to heat the magnetic medium, and the reader element.

17. The method of claim 12, comprising:
storing information corresponding to a value of one or more bits during an elapsed time between a mode hop event and the adjustment of the current; and
providing information to a writer element subsequent to the adjustment of the current, the writer element configured to write the information to the magnetic medium.

18. A system, comprising:
a magnetic medium;
a laser diode;
a reader element; and
a controller configured to:
receive, from the reader element, an indication of one or more properties of the magnetic medium detected by the reader element; and
adjust, responsive to the indication and using components disposed along a same movable arm as a laser driver configured to heat the magnetic medium, a current provided to the laser diode, the laser diode configured to heat the magnetic medium.

19. The system of claim 18, further comprising:
a writer element, the controller configured to provide information to the writer element to write the information to the magnetic medium, based on the indication.

* * * * *